Jan 4, 1938. L. H. DARBYSHIRE Re. 20,610
CABINET DESIGN
Original Filed Oct. 9, 1933
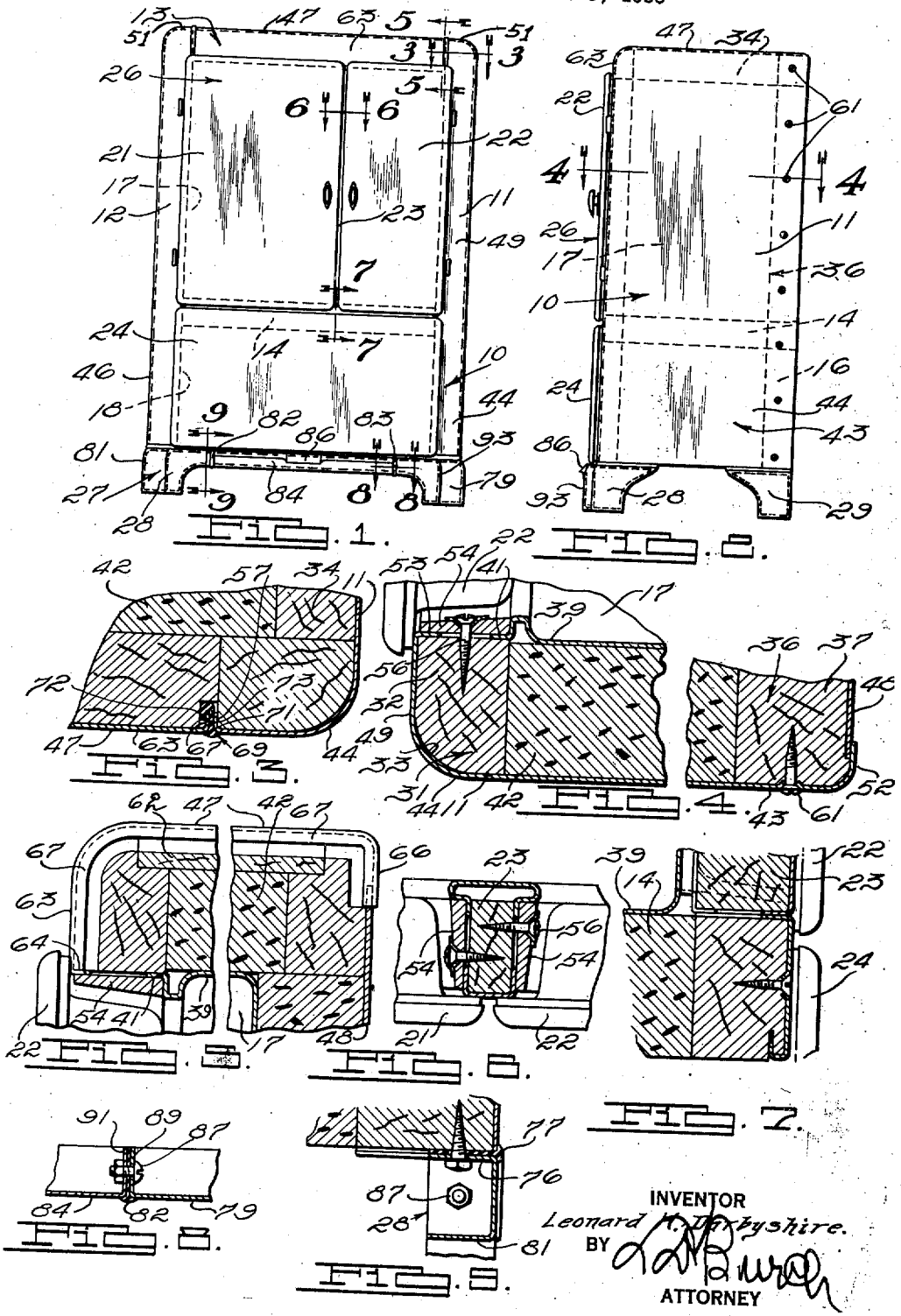
INVENTOR
Leonard H. Darbyshire.
BY
ATTORNEY Reissued Jan. 4, 1938 Re. 20,610

UNITED STATES PATENT OFFICE 20,610

CABINET DESIGN

Leonard H. Darbyshire, Detroit, Mich., assignor, by mesne assignments, to Borg-Warner Corporation, a corporation of Illinois Original No. 2,059,182, dated October 27, 1936, Serial No. 692,882, October 9, 1933. Application for reissue February 4, 1937, Serial No. 124,143

19 Claims. (Cl. 220—9)

This invention relates to the construction of cabinets generally employed for refrigeration purposes and has particular relation to the outer wall, frame, and supporting structure which such cabinets ordinarily embrace.

An object of the invention is to provide a cabinet which shall be easy to assemble, attractive in appearance, and which can be manufactured at a cost comparable with the cost of cabinets of other designs now being produced.

Another object of the invention is to provide a cabinet for refrigeration purposes, the outer surface of which is covered by a shell embracing among other parts, a pair of end pieces or sections which are provided with flanged edge portions projecting inwardly toward the central portion of the cabinet upon the front and upper walls thereof.

Another object of the invention is to provide a cabinet having an outer shell portion formed to cover the surface thereof and embracing a pair of end sections connected at the top by a top panel covering only a portion of the upper surface of the cabinet with the remaining portion of such surface being covered by inwardly projecting portions of the panels employed for covering the ends of the cabinet.

Another object of the invention is to provide a new type of base or supporting legs for refrigerators which will provide for the latter a more rigid support and at the same time will give to the appearance of the entire structure a more massive and pleasing effect.

Another object of the invention is to provide for a cabinet to be employed for refrigeration purposes, a support consisting of a pair of spaced legs having a connecting portion adjacent the upper extremities thereof which will not only provide a stiffening element for the legs, but will provide a substitute for a panel member which ordinarily has been embodied in the cabinet structure supported by the legs.

Another object of the invention is to provide a resilient separating member to be disposed between the lower surface of a cabinet employed in refrigeration purposes and one or more of the legs supporting the cabinet for the purpose of deadening the sound vibrations generated in the refrigerating mechanism employed in the cabinet and which might otherwise be transmitted through the cabinet legs to within the building in which the refrigerator is employed.

The embodiment of the invention disclosed for the purpose of illustration comprises generally a pair of end sections which, in the present instance, are formed from a single sheet of metal by suitably constructed dies and each of which is provided with inwardly flanged edge portions at the upper and the front and rear edge portions thereof. The flanges at the front of the end sections aforesaid, project inwardly for the purpose of covering the front surface of the cabinet beyond the door openings formed therein and at the upper extremities thereof, the flanged portions project inwardly to provide preferably a flush joint with an upper section, the forward edge of which extends downwardly toward the aforesaid door openings and in such region provides for closing the space between the inwardly flanged front and upper portions of the end panels.

The refrigerator, if desired, may be provided with a frame of any suitable character, an insulated inner compartment for storing provisions, and a machine compartment for housing the refrigerating mechanism with which such cabinets ordinarily are provided. Any number of doors may be employed for obtaining access to the interior of the refrigerated compartment and to the machine compartment employed therewith.

The legs, in the present instance, are formed of stamped sheet metal and extend a considerable distance along the two sides of the cabinet adjacent each corner. The legs, however, may be formed of any suitable material and may be of any desired design.

At the front of the cabinet there is employed an elongated reinforcing panel which extends downwardly just below the front of the cabinet and fills the space between the two front legs. Rubber gaskets are employed between the flanged upper portion of each of the legs and the lower parts of the cabinet adjacent thereto and between the front reinforcing panel and the legs and the lower part of the cabinet adjacent such panel.

It will be observed that a plurality of doors are employed on the front of the cabinet for the refrigerating and machine compartment and that such doors are so closely disposed together as to provide a substantially continuous panel over the entire front of the cabinet in the space within the border formed by the inwardly projecting front flanges of the two side panels and the downwardly projecting front flange of the upper panel. This construction not only saves some of the material heretofore required in finishing up the front of a cabinet, but it contributes materially to the beauty and symmetry of the entire structure.

For a better understanding of the invention, reference may now be had to the accompanying drawing forming a part of this specification, in which:

Fig. 1 is a front elevational view of a cabinet structure embracing the principles of the invention herein disclosed;

Fig. 2 is an end elevational view of the cabinet structure illustrated in front elevational view by Fig. 1;

Fig. 3 is a fragmentary horizontal sectional view of the cabinet taken substantially in the plane of line 3—3 of Fig. 1;

Fig. 4 is a fragmentary horizontal sectional view of the cabinet taken substantially in the plane of line 4—4 of Fig. 2 and looking in the direction of the arrows thereon;

Fig. 5 is a fragmentary vertical sectional view taken at one of the upper corners of the refrigerator and substantially in the plane of line 5—5 of Fig. 1;

Fig. 6 is a fragmentary horizontal sectional view taken in the plane of line 6—6 of Fig. 1;

Fig. 7 is a vertical sectional view taken through the cross-frame structure at the lower front part of the insulated compartment formed in the refrigerator and illustrating the structure as it would appear substantially in the plane of line 7—7 of Fig. 1;

Fig. 8 is a fragmentary sectional view taken substantially in the plane of line 8—8 of Fig. 1; and Fig. 9 is a fragmentary sectional view of the base and a lower portion of the cabinet structure to which the base is secured, the view being taken substantially in the plane of line 9—9 of Fig. 1.

The cabinet 10 employed in practicing the invention consists generally of a pair of side walls 11 and 12, an upper wall 13, an intermediate wall or lower refrigerating compartment wall 14 and a rear wall 16. Inside the two walls 11 and 12 and between the lower wall 14 and the upper wall 13, there is formed a heat insulated refrigerating compartment 17, and beneath the wall 14 and between the walls 11 and 12, there is formed a machine compartment 18 in which the condensing unit (not shown) for the refrigerating mechanism may be disposed. The walls of the refrigerating compartment 17 are provided with thick insulating slabs of any suitable character, and the walls of the machine compartment 18 are provided, if desired, with relatively thin sound-absorbing slabs for damping out the vibrations and noises originating in the refrigerating mechanism located therein.

The refrigerating compartment 17 may have one or more doors such as those indicated at 21 and 22. When two doors are employed, as in the present instance, there generally is provided a center post or pilaster, such as that indicated at 23, for enclosing the space between the doors and providing a solid obstruction against which the inner edges of the doors are supported. These doors normally are heat insulated, as are the remainder of the walls of the refrigerating compartment 17. The front of the machine compartment 18 is enclosed by a door 24 which is substantially of the same width as are the two doors 22 and 21, and the upper edge of the door is spaced beneath the lower edges of the doors 21 and 22 by such a slight distance as to give the entire front of the cabinet the appearance of being covered by a unitary panel. Considering these doors as a unitary panel indicated generally at 26, it will be observed that the spaces beyond the sides of the panel at the upper and side extremities thereof, are substantially equal. It also will be observed that the space between the two doors 21 and 22 is substantially of the same width as the space between the lower edges of the two doors 21 and 22 and the upper edge of the machine compartment door 24.

The entire cabinet structure is supported by a base 27 consisting of front sections 28 supporting the front of the cabinet, and a pair of sections or legs 29 supporting the rear of the cabinet.

In order to provide a supporting structure for the several walls of the cabinet 10, there is employed internally thereof, a frame 31, the front portion of which is formed around the front of the cabinet to provide a door frame 32 through which the insulated refrigerating compartment 17 in the interior of the cabinet is accessible. The front and outer edges of the frame at the top and two sides of the cabinet surrounding both the refrigerating compartment 17 and the machine compartment 18 are relieved to provide a widely rounded edge indicated at 33, so that the exterior covering of the cabinet can be formed with the desired contour in such regions. At the upper corners of the cabinet there are also a pair of rearwardly extended frame members indicated at 34 and the upper outer corners of which are rounded as indicated at 33, to provide clearance for permitting the formation of the outer shell of the cabinet in such regions to provide the desired contour.

The rear of the cabinet is supported by a rear frame indicated at 36, consisting of a pair of vertical side members 37 and cross members arranged at points between the two for giving the frame the proper strength and rigidity. Various other cross members are provided between the front and rear frames 31 and 36 for the purpose of rigidly maintaining the two frames in proper relation. Inside the refrigerating compartment 17 and within the various frame members located thereabout and within the walls of the cabinet, there is disposed an inner shell or tank member 39, and the front edges of which are provided with flanges indicated at 41, which are secured to the inside edge of the front frame 31 around the door opening formed therein.

Outside of the tank 39 and between the frame members thereabout, there are employed slabs of heat insulating material indicated at 42, which tend to materially reduce the flow of heat between the interior and the exterior of the cabinet.

A top sub-panel 62, of wood or any other suitable reinforcing material, is disposed above the insulating material 42 on the top of the container 39 and is secured between the front, side, and rear top frame members and supported thereby in such a manner that the upper surface is flush with that of said frame members. Sub-panel 62 is cut away at the side edges thereof to provide a groove extending across the top of the frame and which is adapted to receive flanges provided on the top and side panels of the cabinet.

For covering the exterior of the cabinet, there is employed an outer shell or covering indicated generally at 43 and consisting principally of a pair of side panels 44 and 46, an upper panel 47 and a rear panel 48. The two side or end panels 44 and 46 extend from top to bottom of the cabinet, along the sides of the machine compartment 18 and the refrigerating compartment 17, and not only cover the two walls of the cabinet at the sides thereof, but also cover portions of the front, top and back walls of the cabinet inside the inwardly projecting front, top and rear flanges 49, 51 and 52 thereof. These panels preferably are made of sheet metal and shaped in a die, suitable for the purpose, although it is apparent that they can be formed of any desired material and by any suitable process. The inner edges of the front flanges 49 are formed with securing flanges 53 which extend inwardly of the opening to the refrigerating compartment 17 and are secured to the inner edges of the door frame 31 directly opposite the flanges 41 formed on the inner shell or tank 39. All of the flanges, such as are indicated at 41 and 53, are covered by trim strips indicated at 54, which are secured to the inner surface of the door frame 32 by screws 56.

The top flanges 51 and also the front edge of the front flanges 49 down to the door opening in the cabinet, are provided with inwardly projecting securing flanges indicated at 57, which project into grooves formed in the insulating material and the frame of the cabinet in regions adjacent thereto.

The side panels 44 and 46 are put on the walls of the cabinet by first inserting the securing flanges 53 inside the door opening and holding the remainder thereof away from the cabinet and upwardly beyond the normal position thereof, to such an extent that the upper securing flanges 57 are free to move above the upper surface of the cabinet. From this position, the sections are pivoted inwardly upon the flanges 53 until the sides of the cabinet are engaged by the inward surfaces thereof, and the flange 52 is in position upon the rear cabinet wall. When the panels are in this position, the flanges 57 are immediately above the grooves formed in the top of the cabinet and may thereafter be inserted therein simply by allowing the panels to slide downwardly upon the cabinet side walls. In order to prevent the panels from rattling or from becoming displaced upon the frame, any number of screws, indicated at 61, may be employed along the rear and upper edges of the panels to secure them in position.

The top panel 47, which, in the present instance, is substantially of the same cross sectional contour as are the two side panels 44 and 46, also has a front flange 63 projecting downwardly across the front of the cabinet and into the door opening space therein and the lower end of which is provided with an inwardly projecting securing flange 64, which is adapted to be secured around the lower surface of the upper section of the door frame 32. The rear edge of the top panel 47 also is turned downwardly, as is indicated at 66, for the purpose of engaging a portion of the back of the cabinet, as do the rear flanges 52 on the side panels 44 and 46. The opposite edges of the upper panel 47 are turned downwardly and inwardly across the top and front and rear sections thereof, respectively and as is indicated at 67, to provide securing flanges 67 which are adapted to extend downwardly into the grooves formed in the top, front and rear of the cabinet and into which the securing flanges 57 also project.

When the upper panel 47 is in position upon the upper surface of the cabinet, the flanges 67 are spaced a short distance from the flanges 57 located directly oppositely thereto, to provide spaces for receiving resilient gaskets 69. These gaskets, which may be formed of any suitable kind of soft and resilient material, are preferably formed with an outer meet portion 71 and an inner lock portion 72, which is adapted to project around the inner extremities of the flanges 67 and between which portions there is provided a web portion 73 which is adapted to retain the flanges 57 and 67 in properly spaced relation. The upper panel 47 is placed in position somewhat like the side panels 44 and 46, by inserting the securing flange 64 beneath the lower edge of the upper member of the frame 32 and then moving the rear of the panel downwardly until the rear flange 66 is in position beside the flanges 57. The gasket 69 is placed in position upon the flanges 67 before the top panel is moved into position, and consequently the gaskets slide downwardly into position between the flanges 57 and 67 as the top is moved into place.

It will be observed that the cabinet has the appearance, from the front sides and top thereof, of being constructed principally of three pieces consisting of the side panels 44, 46 and the top panel 47 and a plurality of doors covering substantially the entire front of the cabinet except for the space thereabout formed by the front flange portion of the top and two sides aforementioned. The top panel 47 is so formed and moved into position as to form substantially flush joints with the upper extremities of the two end panels 44 and 46, thus giving the cabinet a pleasing appearance characterized by a classic simplicity of design.

The back of the cabinet can be covered by an ordinary flat covering such as that indicated at 48, and the outer edges of which are secured in any suitable manner inside the flanges 52 of the side panels 44 and 46 and the flange 66 of the top panel 47.

In the present instance, the doors 21 and 22 of the refrigerating compartment 17 and the door 24 of the machine compartment 18 are positioned in such manner as to extend outwardly a slight distance down the front of the cabinet to provide an outwardly projecting paneled effect, although it is apparent that the doors may be put on in any other desired manner without materially changing the appearance of the entire structure.

The base 27, consisting of the front section 28 and the two rear sections 29, normally is secured upon inwardly projecting flanges 76 formed along the upper edges of the parts, and between these flanges and the cabinet there are disposed a plurality of beaded rubber gasket sections indicated generally at 77. The front section 28 of the base consists of a pair of massive legs 79 and 81, and between which there is connected, with suitable rubber gaskets 82 and 83 at opposite ends thereof, a spacing panel or skirt 84. Adjacent the central portion of the panel 84 there is formed, outwardly from the rest of the surface thereof, a projection 86, the surface of which is set at an angle to the vertical surface of the cabinet and base adjacent thereto, to provide a region where the name of the product may be easily seen by anyone standing in front of the cabinet and looking downwardly. The spacing panel 84 is secured to the adjacent edges of the legs 79 and 81 by bolts 87 which are adapted to compress the gaskets 82 and 83 between flanges 89 and 91 formed at the adjacent edges of the aforesaid parts. It is preferable to provide practically all of the edges of the two legs 29, the legs 79 and 81, and the spacing panel 84, with rearwardly extending flanges on both the upper and lower extremities thereof and on intermediate edges therebetween, in order to provide the base structure with adequate structural strength and in addition, to give the entire base a rugged and massive appearance. Where the doors on the front of the cabinet project outwardly thereof, as do the doors in the cabinet 10, disclosed herein, it may be desirable to provide the front face section with a forwardly projecting portion indicated at 93, in the region thereof just below the lower edge of the machine compartment door 24. This portion of the space carries out the general paneled effect formed by the doors in the front surface of the cabinet and prevents the doors from having the appearance of overhanging the base.

The frame structure, insulation, inner and outer coverings, the doors and the base, all may be manufactured as separate units and assembled in production in such manner that any part may be taken off and replaced, in the event it should appear defective or become damaged in any way. For cooling the refrigerating compartment of the cabinet, any desired type of refrigerating mechanism may be employed, and the heat dissipating unit for which may be located in the machine compartment of the cabinet or wherever else desired.

It is to be understood that the invention is not limited to the specific features of the structure disclosed, but is to be considered broadly as is represented by the scope of the appended claims.

I claim:

1. A heat insulated cabinet comprising a top wall, an end wall and a front wall having a door opening formed therein, said door opening having a vertically disposed edge portion in spaced relation to the outer surface of said end wall, said top and front walls having a groove formed across the upper surfaces thereof, respectively, in alignment with said edge of and terminating at said door opening, and a flanged end panel for covering the end surfaces of said cabinet disposed outwardly of said groove and edge of said door opening and the corner formed by the juncture of said three walls, said covering having securing flanges projecting inwardly of said cabinet for engagement therewith within said door opening and said groove.

2. A refrigerator cabinet comprising a plurality of heat insulating walls forming a heat insulated refrigerating compartment and including a top wall, a front wall, and a pair of end walls, said front wall having an access opening formed therein for providing access to said refrigerating compartment, and door means for closing said access opening, covering means for said end walls and comprising a pair of preformed metallic end panels, one for each of said end walls, each of said panels covering an end wall and a portion of said front wall and extending continuously from the back of said cabinet to said door means, covering means for said top wall and comprising a preformed metallic panel extending continuously from the back of said cabinet to said door means, said covering means also including two additional covering portions, one for each side of said cabinet, each of said additional portions being integral with one of said panels and extending continuously over and covering a corner between said top, end and front walls, said covering means completely and continuously covering said top and side walls and the corners therebetween.

3. A refrigerator cabinet comprising a plurality of heat insulating walls forming a heat insulated refrigerating compartment and including a top wall, a front wall, and a pair of end walls, said front wall having an access opening formed therein for providing access to said refrigerating compartment, door means for closing said access opening, a preformed metallic top panel and a pair of preformed metallic end panels for completely and continuously covering said top and end walls, each of said panels being provided with an integral flange, said flanges extending over the corners between said front wall and said top and end walls, respectively, and each of the corners formed by the junction of said top, front and end walls, said flanges completely and continuously covering that portion of said front wall between said door means and said top and end walls respectively.

4. A cabinet structure having three adjoining walls with a corner formed at the juncture of said walls, a continuous groove formed in the outer surface of two of said walls in spaced relationship to the third one of said walls, and a preformed cover for the outer surface of the third one of said walls, said cover having a continuous portion covering said grooved walls between said groove and said third wall and the corner formed at the juncture of said walls and securing flanges arranged to fit within said groove.

5. A refrigerator cabinet comprising a plurality of heat insulating walls forming a heat insulated refrigerating compartment and including a top wall, a front wall, and an end wall defining a corner of said cabinet, said front wall having an access opening formed therein for providing access to said refrigerating compartment, a door for closing said opening, a preformed metallic covering member for said top wall and a portion of said front wall and extending continuously from the back of said cabinet to said door, and a preformed metallic covering member for said end wall and a portion of said front wall and extending continuously from the back of said cabinet to said door, one of said covering members having a portion extending continuously over the corner between said top and end walls and abutting the other of said covering members and covering the corner between said top, end and front walls.

6. A refrigerator cabinet comprising a plurality of heat insulating walls forming a heat insulated refrigerating compartment and including a top wall, a front wall and an end wall defining a corner of said cabinet, said front wall having an access opening formed therein for providing access to said refrigerating compartment, a preformed metallic covering for said top wall and a portion of said front wall and extending continuously from the back of said cabinet to said access opening, and a preformed metallic covering for said end wall and a portion of said front wall and extending continuously from the back of said cabinet to said access opening, one of said coverings having a portion extending continuously over the corner between said top and end walls and adjoining the other of said coverings and covering the corner between said top, end and front walls.

7. A refrigerator cabinet comprising a plurality of heat insulating walls forming a heat insulated refrigerating compartment and including a top wall, a front wall, and a pair of end walls, said front wall having an access opening formed therein for providing access to said refrigerating compartment, door means for closing said access opening, a pair of preformed metallic end panels, one for each of said end walls, each of said panels covering an end wall and a portion of said front wall and extending continuously from the back of said cabinet to said door means, each of said panels further having a portion extending continuously over the corner between said top and end walls and covering the corner between said top, end and front walls, and covering means for completely covering said top wall between said pair of panels and extending from the back of said cabinet to said door means.

8. A refrigerator cabinet comprising a plurality of heat insulating walls forming a heat insulated refrigerating compartment and including a top wall, a front wall, and a pair of end walls, said front wall having an access opening formed therein for providing access to said refrigerating compartment, door means for closing said access opening, a pair of preformed metallic end panels, one for each of said end walls, each of said panels covering an end wall and a portion of said front wall and extending continuously from the back of said cabinet to said door means, each of said panels further having a portion extending continuously over the corner between said top and end walls and covering the corner between said top, end and front walls and covering means for completely covering that portion of said front and top walls between said end panels and extending from the back of said cabinet to said door means.

9. A refrigerator cabinet comprising a plurality of heat insulating walls forming a heat insulated refrigerating compartment and including a top wall, a front wall and a pair of end walls, said front wall having an access opening formed therein for providing access to said refrigerating compartment, a preformed metallic covering for said top wall and extending continuously from the back of said cabinet to said access opening, the lateral edges of said covering being disposed in alignment with the vertical edges of said access opening, a pair of preformed metallic end panels, one for each of said end walls, each of said end panels completely covering an end wall and extending continuously from the back of said cabinet to said access opening, each of said end panels further being provided with a flange portion extending continuously over the corner between said front, top and end walls and the corner between said top and end walls and covering that portion of said top wall adjoining and disposed laterally of said top wall covering.

10. A refrigerator cabinet comprising a plurality of heat insulating walls forming a heat insulated refrigerator cabinet and including a top wall, a front wall, and a pair of end walls, said front wall having an access opening formed therein for providing access to said refrigerating compartment, door means for closing said access opening, a covering for said top wall and extending from the back of said cabinet to said door means, the lateral edges of said covering being spaced inwardly from and disposed parallel to the end walls of said cabinet, and a pair of preformed metallic end panels, one for each of said end walls, each of said end panels completely covering an end wall and extending continuously from the back of said cabinet to said door means, each of said end panels further being provided with a flange portion extending continuously over the corner between said front, top and end walls and the corner between said top and end walls and covering that portion of said top wall adjoining and disposed laterally of said top wall covering.

11. A refrigerator cabinet comprising a plurality of heat insulating walls forming a heat insulated refrigerating compartment and including a top wall and a plurality of side walls, a preformed metallic panel for one of said side walls and including a flange extending continuously over portions of said top wall and the two of said side walls adjacent to said one of said side walls, said panel also extending continuously over all of the corners between said three mentioned side walls and said top wall, one of said side walls having an access opening formed therein for providing access to said refrigerating compartment, one edge of said panel defining an edge of said access opening, and a preformed metallic panel for said top wall for completely covering the surface thereof adjoining said flange and having depending portions covering portions of said two adjacent side walls and the corners between said two adjacent side walls and said top wall, at least one of said depending portions extending downwardly substantially only to the level of the upper horizontal edge of said access opening.

12. A refrigerating cabinet comprising a plurality of heat insulating walls forming a heat insulated refrigerating compartment and including a top wall, a front wall and a pair of end walls, said front wall having an access opening formed therein for providing access to said refrigerating compartment, door means for closing said opening, a covering for said top wall and extending from the back of said cabinet to said door means, the lateral edges of said covering being disposed parallel with said end walls, and a pair of preformed metallic end panels, one for each of said end walls, each of said panels completely covering an end wall and extending continuously from the back of said cabinet to said door means, each of said end panels further being provided with a flange portion extending continuously over the corners between said front, top and end walls and covering that portion of said top wall adjoining and disposed laterally of said top wall covering.

13. A refrigerator cabinet comprising a plurality of heat insulating walls forming a heat insulated refrigerating compartment and including a top wall, a front wall, and an end wall defining a corner of said cabinet, said front wall having an access opening formed therein for providing access to said refrigerating compartment, a door for closing said opening, a preformed metallic covering member for said top wall and extending continuously from the back of said cabinet to said door, and a preformed metallic covering member for said end wall and a portion of said front wall and extending continuously from the back of said cabinet to said door, one of said covering members having a portion extending continuously over the corner between said top and end walls and abutting the other of said covering members and covering the corner between said top, end and front walls.

14. A refrigerator cabinet comprising a plurality of heat insulating walls forming a heat insulated refrigerating compartment and including a top wall, a front wall, and a pair of end walls, said front wall having an access opening formed therein for providing access to said refrigerating compartment, door means for closing said access opening, preformed top and end wall metallic covering means for completely and continuously covering said top and end walls, said covering means being provided with integral flange portions, said flange portions extending over the corners between said front wall and said top and end walls, respectively, and each of the corners formed by the junction of said top, front and end walls, said flange portions completely and continuously covering that portion of said front wall between said door means and said top and end walls, respectively, and said end wall covering means extending beyond said refrigerating compartment to define the side walls of an apparatus compartment below said refrigerating compartment.

15. A refrigerator cabinet comprising a plurality of heat insulating walls forming a heat insulated refrigerating compartment and including a top wall, a front and an end wall, said front wall having an access opening formed therein for providing access to said refrigerating compartment, a door for closing said access opening, a preformed metallic end panel and a preformed metallic top panel for completely and continuously covering said end wall and that portion of said top wall in line with said door, each of said panels being provided with an integral flange, said flanges extending over the corners between said front wall and said top and end walls, respectively, and the corner formed by the junction of said top, front and end walls, said flanges completely and continuously covering that portion of said front wall between said door and said top and end walls, respectively, and said end panel extending beyond said refrigerating compartment to define a side wall of an apparatus compartment.

16. A heat insulated cabinet comprising a refrigerating compartment having an upper wall, said upper wall having a door opening beneath the front edge portion thereof, a pair of spaced and parallel grooves formed from front to rear of said wall and across said front edge portion, and a top panel for covering said wall, said top panel having an edge portion projecting within said door opening, a portion extending across the front edge of said upper wall, a portion extending across the top of said upper wall and said front edge and top portions of said cover being provided with flanges extending into said spaced and parallel grooves.

17. A heat insulated cabinet provided with a top wall, a pair of side walls and a front wall, said walls forming a heat insulated compartment internally thereof and said front wall being provided with a door opening therein for obtaining access to said heat insulated compartment, said front and top walls having a spaced pair of grooves extending thereacross in alignment with the side portions of said door opening, a cover for said top and a portion of said front walls, said cover being provided with a pair of laterally projecting flanges for insertion within said grooves, and a pair of resilient gaskets provided with grooves adapted to receive said flanges whereby said flanges and gaskets may be projected into said grooves in said walls when said cover is moved downwardly upon the latter.

18. A refrigerator cabinet comprising a plurality of heat insulating walls forming a heat insulated refrigerating compartment and including a top wall, a front wall, and a pair of end walls, said front wall having an access opening formed therein for providing access to said refrigerating compartment, door means for closing said access opening, a pair of preformed metallic end panels, one for each of said end walls, each of said panels covering an end wall and a portion of said front wall and extending continuously from the back of said cabinet to said door means, each of said panels further having a portion extending continuously over the corner between said top and end walls and covering the corner between said top, end and front walls, covering means for completely covering said top wall between said pair of panels and extending from the back of said cabinet to said door means, and spacer members arranged between the adjacent edges of said panels and said covering means.

19. A refrigerator cabinet comprising refrigerating and apparatus compartments and including front, top and end walls, an access opening to said refrigerating compartment in said front wall, a door for closing said opening, an outer covering for completely and continuously covering one of said top and end walls and comprising a preformed metallic panel member having a continuous flanged portion extending along at least two sides thereof and forming a corner, said portion covering that part of said front wall between said door and said one of said top and end walls and forming a continuation of an outer covering for the other of said top and end walls, an outer covering member for said other of said top and end walls and comprising a preformed metallic panel member having an integral flanged portion covering that part of said front wall between said door and said other of said top and end walls, one of said panel members extending beyond said refrigerating compartment to define a wall of said apparatus compartment.

LEONARD H. DARBYSHIRE.